July 23, 1946.  E. E. HANSON ET AL  2,404,766
FUEL TANK
Filed Jan. 21, 1941  2 Sheets-Sheet 1
FIG. I.
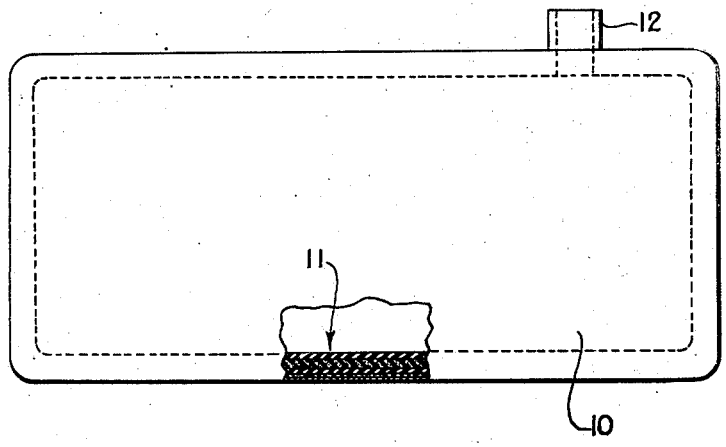
FIG. II.
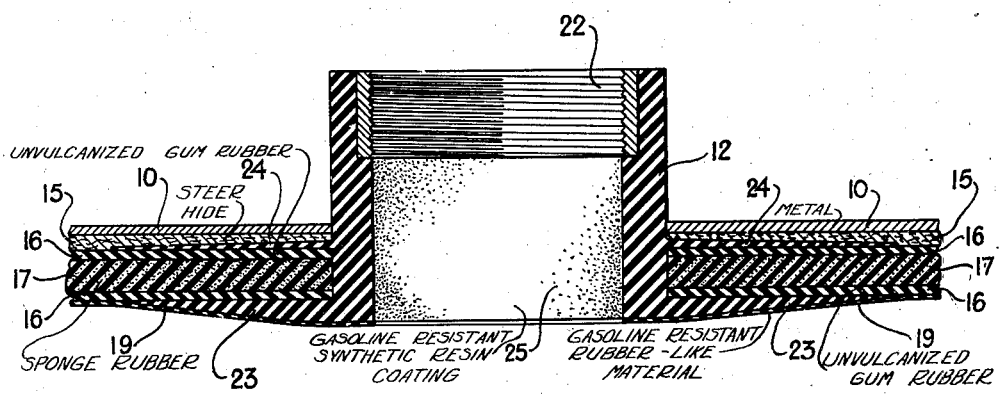
INVENTOR
ELMO E. HANSON
AND
CHARLES R. PARK
BY
ATTORNEYS

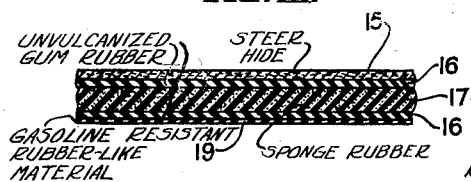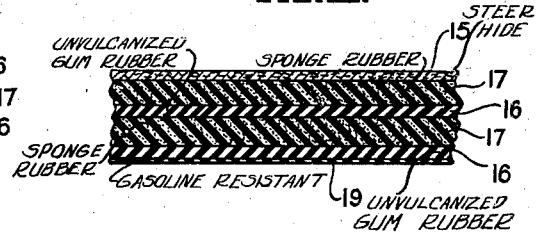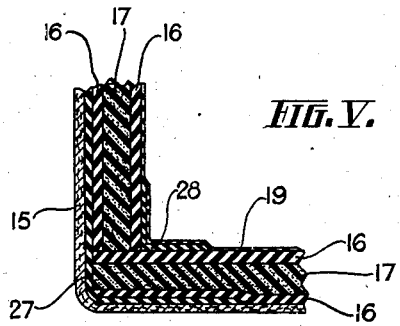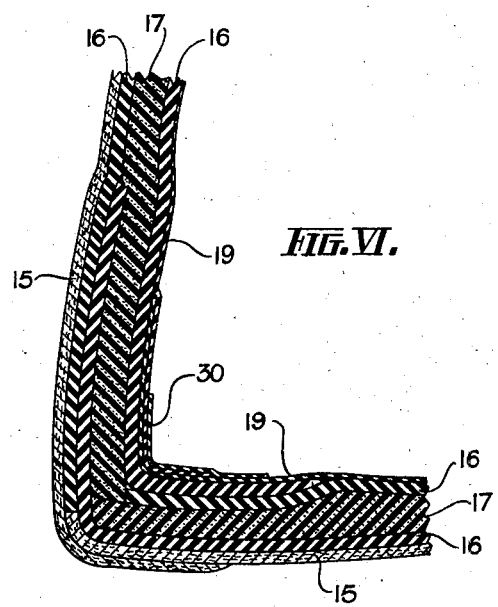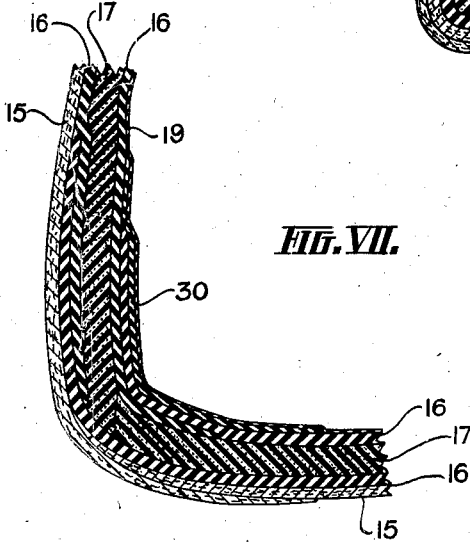

Patented July 23, 1946

2,404,766

UNITED STATES PATENT OFFICE 2,404,766

FUEL TANK

Elmo E. Hanson, Akron, and Charles R. Park, Silver Lake Village, Ohio, assignors to The Firestone Tire & Rubber Company, Akron, Ohio, a corporation of Ohio Application January 21, 1941, Serial No. 375,180

3 Claims. (Cl. 154—43.5)

This invention relates to fuel tanks such as are utilized for hydrocarbon fuels such as high octane aviation gasoline, and more especially it relates to fuel tanks having walls that are self-sealing after puncture by gunfire. The invention is of especial utility for the fuel tanks of airplanes, but also may be usefully employed for the fuel tanks of dirigible airships, scout cars, and other types of military vehicles that are propelled by internal combustion engines and are vulnerable to small arms gunfire.

The feature of providing fuel tanks with leak-preventing means is not broadly new, and numerous expedients have been employed to this end. The most satisfactory means yet found for sealing a punctured fuel tank comprises materials which swell or expand when exposed to gasoline, and thus effect closure of the puncture in the materials. The fuel tank proper usually is constructed of aluminum or an alloy thereof, and the self-sealing materials have been placed interiorly of the tank so as to constitute a lining therefor, or have been mounted on the exterior thereof in the form of a sheath.

Although the latter form of construction has the advantage of having the self-sealing structure normally out of contact with the fuel in the tank, it also has serious disadvantages. A bullet striking a fuel tank is likely to form but a small hole therein upon entering, but frequently the bullet is deflected or tumbles so that it strikes the opposite wall of the tank broadside and thus tears a hole therein much larger than its own diameter. This causes the spreading or "flowering" of the metal tank wall about the puncture, the ragged prongs of the metal holding the sealing material away from the hole in the tank. This produces a tension in the self-sealing material about the hole therein, and causes the hole in the material to spread, thereby enabling the fluid to escape from the tank. Furthermore, gasoline that spills or leaks from a fuel tank frequently collects in a pool between the bottom of the tank and the self-sealing covering, to the detriment of the latter. Accordingly in the present invention the self-sealing structure is positioned interiorly of the metal tank and constitutes a lining for the latter.

The chief objects of the invention are to provide a fuel tank lining of the character mentioned that has sufficient strength to withstand tension; that has adequate strength to restrain the wall of the lining structure from bulging into a hole in the metal tank; to provide a lining structure comprising materials that will swell when in contact with gasoline and thus close an aperture produced by a projectile; to provide sealing material for the purpose mentioned that is not readily soluble in gasoline, whereby fouling of fuel lines is avoided; to provide sealing materials that are free from excessive cold flow; to provide a self-sealing tank lining composed of materials that do not shatter and produce undue debris when struck by a projectile, since this also might clog fuel lines; to provide sealing material for the purpose mentioned that will function effectively at reduced temperatures; to provide a tank-lining structure having walls of sufficient flexibility to allow the structure to collapse for insertion through a relatively small aperture; and to provide a tank-lining structure having strong and resilient walls of sufficient stiffness to enable the lining to support itself. Other objects will be manifest as the description proceeds.

Of the accompanying drawings:

Figure I is an elevation of a fuel tank embodying the invention, a portion thereof being broken away and in section revealing the lining construction thereof;

Figure II is a transverse section through a typical arrangement of tank-lining plies at the filling neck thereof;

Figure III is a detail sectional view, on a larger scale, of the lining construction shown in Figure I;

Figure IV is a detail sectional view of another tank lining construction;

Figure V is a detail sectional view of a typical corner splice of the tank lining, the splice being of the butted type;

Figure VI is a sectional view of a corner splice of the lapped type; and

Figure VII is a sectional view of a corner splice of the step down type.

Referring to Figure I of the drawings, there is shown a conventional metal fuel tank 10 composed of suitable sheet metal such as aluminum alloy. The tank 10 is shown in its simplest form with but a single wall, although double wall and triple wall tanks are in common use. Positioned within the tank 10 is a self-sealing container or cell that is designated as a whole by the numeral 11, said cell constituting a lining for the metal tank 10, although the walls of the cell and tank are not adhered or otherwise bonded to each other. The cell 11 is formed integrally with a filling neck 12 that projects through an opening in the top of the tank 10. It should be understood that the effectiveness of the cell as a leak-sealing means depends not only on the construction of the cell itself, but also upon the behavior of the supporting structure or tank 10. Accordingly it is pointed out that different tank constructions present specific problems, and the arrangement, quantities, and proportions of the various constituent elements of the lining cells must be governed by the character and size of the tank structure, and to a certain extent by the nature of the puncturing fire to which it is likely to be subjected.

Referring to Figure III of the drawings, there is shown a typical leak-sealing cell wall designed to be effective under .30 caliber fire. Said wall comprises an outer ply or facing 15 of steerhide, a ply of unvulcanized pure gum rubber 16 upon one face of the steerhide, a ply of sponge rubber 17 upon the layer of pure gum rubber, a second ply of pure gum rubber 16 upon said sponge rubber, a thin ply of neoprene 19 overlying the second ply 16, and a thin film (not shown) of gasoline resistant resin upon the exposed surface of the neoprene. Other gasoline resistant rubber-like materials, such as Buna N, which is a copolymer of butadiene and acrylic nitrile, may be used in place of the neoprene, which is polymerized 2-chloro-1,3 butadiene. All of the foregoing plies are bonded together (except the resin which is applied directly to the neoprene) with a cement which vulcanizes at room temperature in a few days time, and which is made from a gasoline resistant rubber-like material. This cement affords additional resistance to the passage of gasoline and prevents separation of the various plies of the cell. One satisfactory cement has been made by mixing small amounts of zinc oxide, magnesia, stearic acid, an anti-oxidant, and a softening ingredient with about 93 lbs. of neoprene to form a 100 lb. batch. Then 150 lbs. of the neoprene batch are dissolved in about 39 gallons of benzol to form the cement.

The function of the steerhide outer ply 15 is to impart strength and rigidity to the cell structure. Thus when the cell is punctured by gunfire the steerhide cover effectively restrains the cell wall against excessive stretch. Because of the fibrous nature of the leather, and the random and matted arrangement of its fibers, the impact of the bullet causes only a very limited tear, in which respect it is superior to fabric such as sometimes is used. If, upon impact, a large hole is torn in the metal tank wall by the emerging bullet, the leather, having suffered but relatively small damage, still functions to support the head of liquid and to prevent stretching of the rubber portions of the cell wall. Such stretching would of course result in the enlarging of the hole and thus permit leakage.

The unvulcanized pure gum rubber plies 16 are made by juxtaposing a plurality of thin rubber sheets, and they are of especial importance in the hole-sealing function of the lining cell 11. This rubber consists only of pure rubber that has never been subjected to heating, smoking, milling, compounding, or any other process that would detract from its inherent toughness. It is procured by deposition directly from rubber latex and usually the various laminations are combined while the rubber obtained is still wet. Although its chief function is to seal wounds in the cell wall, its toughness and strength enable it to function as structural material also. Another desirable characteristic of the rubber is that it returns to its original shape, or flows together after a bullet or other object passes through it, even though it has not come into contact with gasoline and no swelling action has been set up therein. When in contact with gasoline, it swells rather rapidly and only goes into solution slowly after prolonged exposure, in which feature it is superior to milled smoked sheet, since the latter, while swelling at a comparable rate, goes into solution very rapidly. Certain synthetics that have been proposed as sealing materials also have the same drawback. The specific gravity of the uncompounded rubber is .93 which is substantially lower than can be achieved by any type of compounded semi-cured rubber. The pure gum rubber is effective for sealing at −20° F. as required by Army Air Forces specifications, as are all other materials used in the self-sealing cell, none of them being brittle at −48° F.

The sponge rubber ply 17 is employed as a leak-sealing agent because of the rapidity with which it swells when in contact with gasoline, being much faster in this respect than the pure gum rubber plies. The sponge rubber, however, is not entirely satisfactory from the standpoint of permanence, whereas the pure gum of plies 16 and 18 is practically permanent. Thus the two materials supplement each other and therefore are employed in juxtaposition in sealing cell walls. The sponge rubber employed has extremely fine, or small cells and is manufactured by the use of a blowing agent so that the cells thereof are non-communicating. This makes it impossible for the sponge rubber to act in the manner of a wick to convey gasoline for a distance away from a wound, in which respect it differs from most other types of rubber sponge. However, sufficient gasoline passes through, or is present in the sponge to effect swelling thereof when the sponge is ruptured. The low specific gravity (.14 approx.) of the sponge rubber makes it the lightest material available, and its fine structure enables it to expose a relatively large surface area to a rupture, with the result that there is rapid attack by the gasoline and resultant rapid swelling. Experience has shown that during the first five minutes in contact with gasoline, this sponge rubber increases approximately 10% in linear dimension. Another advantage in using sponge in the cell wall is that it enables the plies of rubber bonded thereto to move with relation to each other.

Since the sealing plies swell rapidly when in contact with gasoline, it is essential that an interior lining or facing that is impervious as well as resistant to the deteriorating effects of gasoline be provided for protecting the sealing plies. The best material at present available for this purpose is known by the trade name of neoprene, which may be defined as a synthetic rubber-like product having practically all of the physical characteristics of rubber. Since the sole function of the neoprene ply is to protect the sealing plies of the cell from contact with gasoline during normal use of the tank, only a very thin layer thereof is required, a thickness of .020″ having been found to be sufficient. Since the neoprene ply is not required to impart strength to the cell, it does not require to be reinforced, as by means of fabric, for example. This is a desirable feature since fabric tears badly upon impact of a projectile, whereas the latter produces a hole of restricted size in an unreinforced neoprene sheet.

Although neoprene is the best material at present known for the purpose described, it is not a perfect bar to the passage of gasoline, especially when exposed to the latter for a relatively long time. Accordingly, the exposed surface of the neoprene facing is coated with gasoline resistant synthetic resin. The resin coating is in the nature of a thin film of about .002" thickness, and accordingly is incapable of illustration in the drawings. A suitable resin for this purpose is an acrylic resin, and two or three coats thereof may be applied to the cell lining. The first one or two coats of the synthetic resin are applied to the cell in the form of a water dispersion of the resin, the same being marketed under the trade name of "Acrysol." The final coating is a solution of the resin and is known to the trade by the name "Acryloid." Other resins than that noted may be found suitable for the purpose set forth, but any resin that is used must be practically impervious to gasoline, and must be extensible and resilient so as not to crack under any conditions to which the cell is subjected. The resin coating also reduces the amount of extract which it is possible for gasoline to remove from a tank lining such as that described. For example, a quantity of gasoline was placed in a half gallon tank lined with an uncoated Neoprene cell for forty-eight hours and then 100 cc. of gasoline were removed from the tank, evaporated to dryness, and 95 milligrams of residue were obtained. A similar test using a neoprene lined cell coated with the resinous film described produced but 4 milligrams residue in the same amount of gasoline. In other tests with other coating materials, the residue ranged from 6 milligrams to 100 milligrams. In some cases it may be desirable to place the resin coating upon the inner layer of latex rubber and omit the ply of neoprene.

Although the invention aims to provide a sealing wall that is effective against gunfire and stable during normal usage, it is likely that no material of this type can be expected to be positively effective against all shots, since the impact varies greatly in shots of different caliber and shots that penetrate the tank from different angles. However, the materials and arrangement and construction herein set forth greatly reduce the hazard of all shots, and are highly effective in completely sealing a very high percentage of punctures resulting from gunfire.

In Figure IV is shown another lining cell construction that utilizes the same constituent elements as the embodiment previously described, but differs from the latter in the arrangement of its plies, and also in the amount of material employed. Thus the cell wall shown comprises an outer ply or facing of steerhide 15, a second ply of sponge rubber 17, a third ply of pure gum rubber 16, a fourth ply of sponge rubber 17, a fifth ply of pure gum rubber 16, and an inner facing ply of neoprene 19, the latter being treated on its exposed face with the gasoline-resisting resin previously described. In addition to the extra ply of sponge rubber employed, the pure gum rubber plies are about twice the thickness of the pure gum plies of the structure shown in Figure III. The construction is heavier than that previously described, and its use is necessary only where the surrounding structure is such as to require its added rigidity and protection. The construction has been found to be effective against 50 caliber projectiles. In most cases, however, the lighter construction will be found to be satisfactory.

In Fig. II, there is shown the construction employed at the filling neck 12 of a tank lining cell of the construction shown in Figure III. The filling neck 12 is a tubular structure composed entirely of neoprene, and has an internally threaded metal ring 22 molded into its inner circumference, at the outer end thereof, for receiving a suitably threaded cap (not shown) that constitutes a closure for the cell 11. At its inner end, the neck 12 is formed on its periphery with a circular, radially outwardly extending flange 23 that tapers to a feather edge at its margin, and spaced from flange 23 a distance appreciably less than the thickness of wall of cell 11, the said neck is formed with a second flange 24. The latter is circular, may be substantially smaller in diameter than flange 23, and tapers to a feather edge at its margin. The filling neck 12 is mounted in a suitable aperture in the top wall of cell 11, the flanges 23, 24 of the neck having the sponge rubber ply 17 and two adjacent pure gum rubber plies 16 disposed between their confronting faces. The steerhide ply 15 overlies the flange 24 and the neoprene ply 19 covers the exposed face of flange 23. Said wall plies and the filling neck flanges are bonded to each other by neoprene cement, and the resin coating on the neoprene ply 19 is continued into the interior of the filling neck 12 as is indicated at 25.

The corners of the cell 11 are formed by splicing together the margins of the cell walls, and three alternative splice constructions are shown herein. The splice shown in Figure V is a butt splice, one wall structure consisting of a sponge rubber ply 17 with pure gum rubber plies 16 on opposite sides thereof and being butted against and cemented to a similar wall structure at right angles thereto. A relatively thin binder strip 27 of pure gum rubber is overlaid locally upon the exterior angle of the corner formed by the abutted structures, and a narrower binder strip 28 of the same material is provided upon the interior angle formed by the abutted plies. The neoprene lining of the cell covers the binder strip 28 and the steerhide outer facing 15 covers the binder strip 27. All of said plies are bonded together by neoprene cement as previously described.

The splice shown in Figure VI is a lapped splice joining two walls that are disposed at right angles to each other. In this construction each sponge rubber ply 17 has a ply of pure gum rubber 16 on each of its faces, and at the adjoining ends of each wall one of the plies 16 is substantially extended and lapped onto the ply 16 of the other wall. The sponge rubber plies 17 of the respective walls meet in abutting relation as shown. The neoprene linings 19 of the walls are lapped and covered by a neoprene binder strip 30, and the steerhide outer facing 15 is lap-spliced about the exterior angle of the corner splice. All plies, lapped splices and abutted surfaces are bonded together by neoprene cement.

The splice shown in Figure VII is known as a step-down splice. It is essentially similar to the lapped splice shown in Figure VI except that the lapped portions of the various plies are progressively stepped down toward the margins thereof, or are skived so that a less bulky splice is produced. This splice is considered superior to those shown in Figures V and VI, although the latter are cheaper to produce.

In a further modification of the invention, the various plies used in forming the cell walls may be coated with a neoprene cement which is completely dried before the plies are superimposed whereby they do not adhere and may move relatively to one another. However, the cement on the plies prevents excessive dissolution thereof when a hole is formed therethrough and gasoline contacts same. Sometimes the sponge rubber layer can be omitted when this construction is adopted, particularly if the remaining plies are all thickened slightly. Then, too, the various plies of a cell wall may be cemented together only at localized points in some cases.

When the shelf sealing cell of the invention is used in airplanes, it is adapted to be formed of such contour that it can be positioned within a wing of the airplane. This wing, usually metallic, and the partitions therein, then form the confining means for the liquid containing cell of the invention.

It will be seen that, while the cell of the invention is shown within a confining structure, the cell could be placed on the outside of a container, when desired, with the neoprene and resin plies being omitted in such cases. The cell is built up upon a collapsible form when it is to be used within a confining structure.

From the foregoing it will be apparent that the invention provides a fuel tank that is superior in its ability to withstand gunfire without leakage, and which achieves the other advantages set out in the foregoing statement of objects.

Other modifications may be resorted to without departing from the spirit of the invention or the scope thereof as defined by the appended claims.

What is claimed is:

1. A cell for liquid fuel, the walls of said cell comprising an outer ply of steer-hide, a ply of unvulcanized rubber deposited from latex, a ply of fine-grained sponge rubber having non-communicating cells, a second ply of unvulcanized rubber deposited from latex, one inner ply of polymerized 2 chloro-1,3 butadiene, and a protective film of an acrylic resin on the exposed face of said inner ply, said plies being united to each other and arranged in the order set forth from the outside to the inside of each wall.

2. A self-sealing fuel tank comprising an unvulcanized rubber sealing ply adapted to swell upon contact with liquid hydrocarbons, an outer ply of flexible supporting material, an inner lining of hydrocarbon resistant material including a copolymer of butadiene and acrylic nitrile and an extensible, resilient gasoline-resistant synthetic resin, and a tubular fitting consisting of flexible material chemically inactive with hydrocarbons incorporated in the wall of said fuel tank, said fitting comprising a neck portion and spaced parallel flanges thereon, said rubber sealing ply extending between said flanges, said flanges being embedded in the wall of said tank between the outer supporting ply and the inner lining.

3. A self-sealing fuel tank comprising an unvulcanized rubber sealing ply adapted to swell upon contact with liquid hydrocarbons, an outer ply of flexible supporting material, an inner lining of hydrocarbon resistant material including a gasoline-resistant synthetic rubber-like material and an extensible, resilient gasoline-resistant synthetic resin, and a tubular fitting consisting of flexible material chemically inactive with hydrocarbons incorporated in the wall of said fuel tank, said fitting comprising a neck portion and spaced integral parallel flanges thereon, said rubber sealing ply extending between said flanges.

ELMO E. HANSON.
CHARLES R. PARK.